June 25, 1963  R. R. MANDY  3,094,733
WINDSHIELD CLEARING SYSTEM
Filed Oct. 5, 1961  2 Sheets-Sheet 1

INVENTOR
ROBERT R. MANDY
BY
Lowell & Henderson
ATTORNEYS

INVENTOR
ROBERT R. MANDY
BY
Lowell & Henderson
ATTORNEYS

United States Patent Office 3,094,733
Patented June 25, 1963

3,094,733
WINDSHIELD CLEARING SYSTEM
Robert R. Mandy, Detroit, Mich., assignor to The Delman Company, Cookeville, Tenn., a corporation of Tennessee
Filed Oct. 5, 1961, Ser. No. 143,108
10 Claims. (Cl. 15—250.02)

This invention relates generally to a vehicle windshield clearing system and more particularly to a vacuum actuated pump unit of the system.

An object of this invention is to provide a novel vacuum actuated pump unit for a windshield clearing system.

Another object of this invention is to provide means for operating a wiper system in response to operation of the pump unit of a washer system to insure oscillation of the wiper blade when fluid is discharged against the windshield.

Yet another object of this invention is to provide a vacuum actuated pump unit wherein a pair of resilient bellows are arranged in a nested relation to provide a fluid discharge from one bellows in direct response to the application of subatmospheric pressure to the other bellows, there being no fluid connection between the bellows thus eliminating the possibility of leakage therebetween.

A further object of this invention is to provide a vacuum actuated pump unit wherein actuation of the pump results in operation of the wiper system, and wherein a time delay means incorporated with the pump unit automatically maintains operation of the wiper system for a predetermined time, after the pump unit has stopped discharging fluid, and then arrests the wiper system operation.

Another object of this invention is the provision of structure capable of attaining the above mentioned objectives which is economical to manufacture, simple of construction, and effective in operation.

These objects and other features and advantages of this invention will become readily apparent from the following description when taken in conjunction with the accompanying drawings, wherein.

Figure 1:
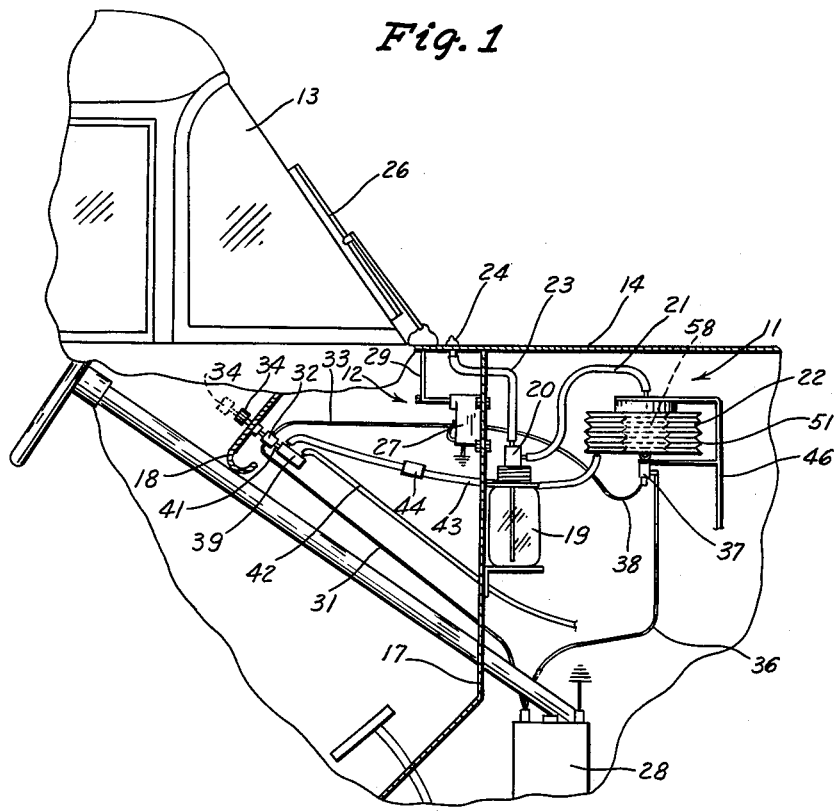
FIG. 1 is a fragmentary side elevational view of a vehicle showing the invention in assembly relation therewith.

With reference to the drawing, a vehicle windshield clearing system is disclosed which includes a washer system and a wiper system, designated generally at 11 and 12, respectively, in FIG. 1. The vehicle is illustrated as having a windshield 13, an engine cowl 14 extended forwardly of the windshield, a fire wall 17 and a dashboard 18.

The washer system 11 includes a fluid reservoir 19 mounted on the fire wall 17 for supplying fluid through a three-way valve 20 and conduit 21 to a vacuum operated fluid pump unit 22. The pump unit 22, upon operation withdraws fluid from the reservoir 19 and through the conduit 21 and valve 20 expels the fluid through another conduit 23 to one or more discharge nozzles 24. Each nozzle 24 is mounted on the cowl 14 at a position forwardly of the windshield 13, and is adapted to discharge the fluid upwardly onto the windshield and into the path of movement of a windshield wiper blade 26.

The blade 26 is part of the wiper system 12, which includes additionally an electric wiper motor 27 energized by a battery 28 to drive the blade 26 in an oscillating manner across the windshield 13 by means of transmission mechanism indicated generally at 29. The battery 28 is connected in an electric circuit which includes a lead 31 to an on-off rotatable hand control switch 32 mounted on the dashboard 18, and another lead 33 connected between the control switch 32 and the wiper motor 27. For independent operation of the wiper motor 27, a knob 34 on the control switch 32 is merely rotated between on and off positions.

The pump unit 22 is connected in the electric circuit by means of a lead 36 from the battery 28 to an on-off switch 37 mounted on the pump unit. Another lead 38 extends between the switch 37 and the wiper motor 27. For controlling the operation of the pump unit 22, a vacuum control device 39 is attached by a reciprocal rod 41 to the control switch knob 34 for a push-pull movement. The control device 39 is of a conventional type, the interior of which is in fluid communication with a supply conduit 42 from a source of subatmospheric pressure, such as the intake manifold of the vehicle, and is also in fluid communication with a feed conduit 43 leading to the pump unit 22. A bleed valve 44 is inserted in the feed conduit 43 for a purpose described hereinafter.

Arrangement of the vacuum control device 39 is such, for example, that when the control knob 34 is in the full line position of FIG. 1, the supply of subatmospheric pressure from the supply conduit 42 to the feed conduit 43 is closed off. However, when the control knob 34 is pulled outwardly to the dotted line position of FIG. 1, the feed conduit 43 is in fluid communication with the supply conduit 42 whereby the subatmospheric pressure is applied to the pump unit 22. Rotation of the control knob 34 does not in any way affect the control of the operation of the vacuum control device 39.

Figure 2:
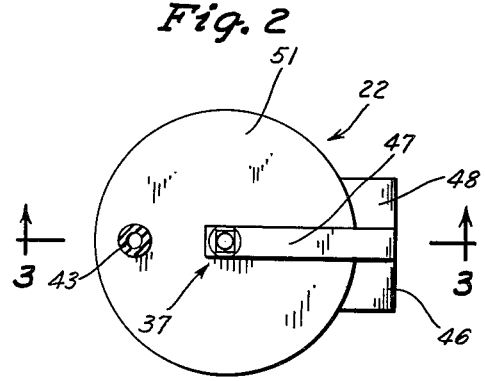
FIG. 2 is an enlarged bottom plan view of the pump unit of the present invention.
Figure 4:
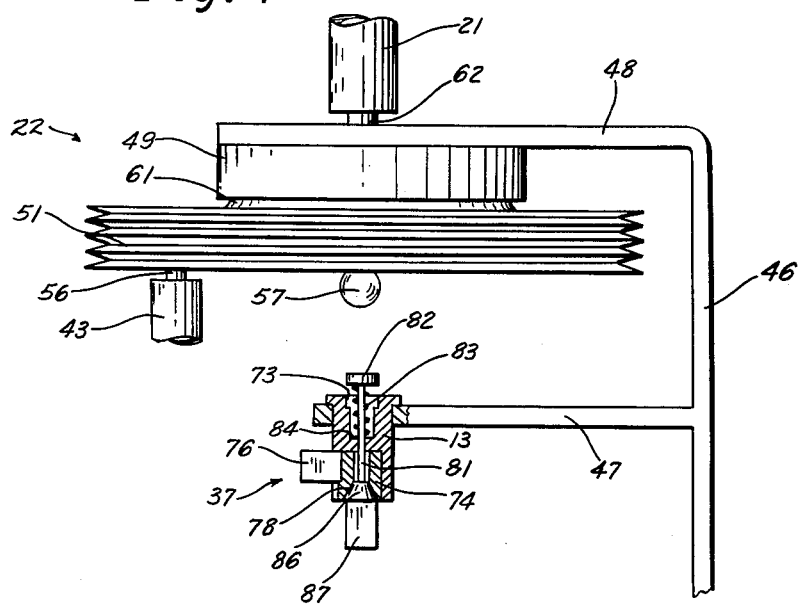
FIG. 4 is a side elevational view similar to FIG. 4, wherein the pump unit is shown in a contracted position, certain parts being shown in section for clarity.
Figure 3:
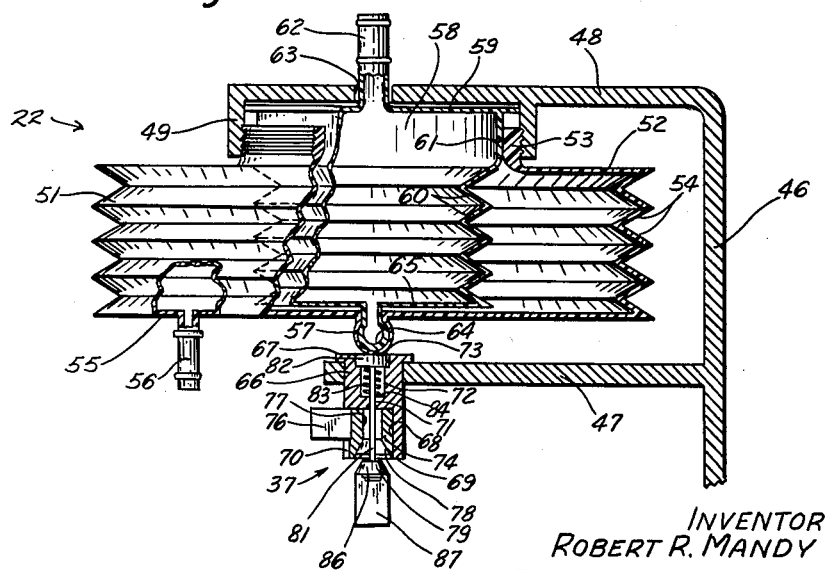
FIG. 3 is an enlarged side elevational view of the pump unit, certain parts broken away and others shown in section for clarity of illustration.

Referring particularly to FIGS. 2–4, the pump unit 22 comprises a mounting frame 46 including a lower leg 47 and an upper leg 48, both legs extended outwardly in vertically spaced relation from the frame 46. An internally threaded collar 49 is formed on the under surface of the upper leg 48 for supporting a normally expanded, resilient hollow plastic bellows 51. The bellows 51 is of a thin wall 52 construction and includes an externally threaded neck portion 53 for threaded engagement with the collar 49. A plurality of accordion-type plaits or folds 54 are formed in the circular wall of the bellows 51, and additionally a fluid fitting 56 and a knob 57 are formed in the bottom wall 55 of the bellows 51. The fitting 56 is adapted to be fluid connected to the conduit 43 (FIG. 1) for transmitting subatmospheric pressure from the control device 39 to the interior of the bellows 51.

A second normally expanded, resilient hollow plastic bellows 58 (FIG. 3) is inserted into the interior of the vacuum bellows 51 for coaction therewith. The bellows 58 includes a thin wall 59 and is provided with accordion-type folds 60 shown here as being of the same size and spacing as the folds 54. A collar 61 is formed at the top of the bellows 58 and is secured to the inner surface of the neck portion 53 in a fluid-tight manner, as by heat, sealing or other conventional means to seal off the interior of the bellows 51. The bellows 58 is provided with a fluid fitting 62 which extends through an opening 63 formed in the upper legs 48, and is also provided on its lower wall 65 with a knob 64 force fitted into the knob 57 so as to securely connect the bottom walls 55 and 65 of the two bellows 51 and 58 together.

By this arrangement, when subatmospheric pressure is applied to the interior of the vacuum bellows 51, the bellows 51 contracts from its normally expanded position and the fluid bellows 58 also contracts in response thereto. This is due to the bottom wall 55 of the vacuum bellows 51 engaging, via the knobs 57 and 64, the bottom wall 65 of the fluid bellows 58. Subsequent expansion of the vacuum bellows 51 due to withdrawal of the subatmospheric pressure, tends to move the bottom wall 55 away from the bottom wall 65 of the fluid bellows 58. However, due to the connection of the knobs 57 and 64, the fluid bellows 58 also is forced to expand. It may well be appreciated that were the bellows 51 and 58 not physically connected, they would still contract and expand together due to the proximity of the bottom walls 55 and 65, and due to their inherent resiliency. The utilization of the simultaneous expansion and contraction of the bellows 51 and 58 will be described more in detail hereafter.

To insure operation of the wiper system 12 in response to operation of the washer system 11, the pump unit 22 includes the electric switch 37 mentioned hereinbefore. A further function of the switch 37 is to provide a timed delay in the de-actuation of the wiper system 11 relative to the stopping of fluid discharge against the windshield 13.

The switch 37 includes a body 66 of non-conductive material provided at one end with a flange 67 for securement to the lower leg 47 (FIG. 3) of the mounting frame 46. A large bore 68 is formed in the switch body 66 at the end 69 opposite the flange 67, and includes a slot 70 extended longitudinally of the bore 68. Inwardly of the bore 68 is a smaller and shorter bore 71 which leads to a slightly larger bore 72 terminating in a circular cavity 73 at the flange end 67 of the switch body 66.

A tubular electrical contact 74 (FIGS. 3 and 4) having a radially extended terminal 76 is forcibly fitted into the bore 68, with the terminal 76 extended through the slot 70. The contact 74 has a bore 77 formed therein which is axially aligned with the switch body bore 71, and the outer end of which is formed with a conically shaped cavity 78. For coaction with the stationary contact 74, there is provided a movable contact 79 which includes a stem 81 coaxially inserted for reciprocal movement through the bore 77 of the contact 73, and through the bores 71 and 72 of the switch body 66.

A collar or stop member 82 (FIG. 3) is secured on the upper end of the stem 81, which upon engagement by the knob 57 of the vacuum actuator bellows 51, is moved and maintained in the cavity 73. A small coil spring 83 is positioned between the stop member 82 and a shoulder 84, formed at the junction of the bores 71 and 72, for normally biasing the stop member 82 and thus the entire movable contact 79, toward the bellows knob 57 or upwardly, as illustrated in FIG. 3.

At the outer or lower end (FIG. 3) of the stem 81 is secured an electrically conductive plug 86 (FIG. 3) having a tapered or frustro-conical shape, and which is adapted to firmly seat in a nested relation within the conical cavity 78. A terminal 87 is secured to the plug 86. Since the bore 77 of the stationary contact 74 is larger and in axial alignment with the small bore 71 of the switch body 66, the stem 81 of the movable contact 79 is in a substantial clearance relation with the bore 77. Thus, should the stem 81 be of a conductive material, engagement with the normally hot contact 75 is eliminated. Additionally, as the stem 81 reciprocates coaxially of the bore 77, the plug 86 moves coaxially of the cavity 78.

In the operation of the clearing system, as mentioned hereinbefore independent operation of the wiper system 12 is accomplished by rotating the control knob 34 between on-off positions where the electric circuit for the wiper motor 27 is either closed to operate the motor, or is open. For coordinated operation of both wiper and washer systems 12 and 11, respectively, the control knob 34 is pulled from the full line position of FIG. 1 to the dotted line position thereof. This movement of the knob 34 is transmitted through the rod 41 to the vacuum control device 39 to permit the subatmospheric pressure in the supply conduit 42 to be applied through the feed conduit 43 to the interior of the normally expanded vacuum bellows 51.

By virtue of the subatmospheric pressure being applied to the interior of the vacuum bellows 51, it collapses from its normally expanded position (FIG. 3) to a contracted position (FIG. 4). In so doing, the fluid bellows 58 is also forced to collapse and changes from a normally expanded position to a contracted position (FIG. 4). As the fluid bellows 58 is normally filled with fluid when expanded, upon contraction the fluid therein is expelled through the conduits 21 and 23 and the nozzle 24 against the windshield 13.

Simultaneously with the movement of the combined bellows 51 and 58 toward their contracted positions, the knob 57 (FIG. 3) moves away from the stop member 82, thus enabling the spring 83 to force the stop member 82 upwardly and out of the cavity 73 (FIG. 4), whereby to seat the plug 86 in the cavity 78. As the stationary terminal 76 is connected through the lead 36 to the vehicle battery 28, and as the movable terminal 87 is connected through the lead 38 to the wiper motor 27, with the plug 86 spaced from the stationary control 74, the switch 37 is normally open. However upon seating the plug 86 in the cavity 73, the circuit is closed thus energizing the wiper motor 27 to oscillate the wiper blade 26 in conjunction with the discharge of fluid through the nozzle 24.

After both washer and wiper systems 11 and 12, respectively, are operating, the operator releases the control knob 34, which has been held outwardly of the dashboard 18, so that it moves back to its full line position of FIG. 1, the knob 34 being ordinarily spring biased toward that position. This movement closes off the feed conduit 43 from the supply conduit 42 and opens the interior of the vacuum bellows 51 to the atmosphere via the bleed valve 44. This valve is of a conventional type which permits air under atmospheric pressure to bleed inwardly thereof and slowly through the supply conduit 43 to the interior of the bellows 51, thereby delaying the expansion of the bellows, even though the fluid bellows 58 has expelled all the fluid therefrom.

As the vacuum bellows 51 expands by its inherent resiliency from the contracted position of FIG. 4, the fluid bellows 58 is also expanded to withdraw a certain quantity of fluid from the reservoir 19 into the interior of the fluid bellows 58. Consequently, after movement to expanded positions of both the bellows 51 and 58, the fluid bellows 58 is recharged with fluid for the next washing cycle.

During the delayed expansion of the bellows 51 and 58, the wiper system 12 continues to operate as the switch 37 remains closed. Only when the outer knob 57 engages the stop member 82 and forces it into its cavity 73, thereby unseating the plug 86 from the cavity 78 and opening the circuit, does the wiper system 12 cease to operate. This arrangement therefore provides for a time delay in the de-actuation of the wiper system 12 relative to the de-actuation of the washer system 11. The length of the delay can of course be varied by adjusting the bleed valve 44.

Although a preferred embodiment of the invention has been disclosed herein, various modifications and alternate constructions can be made thereto without departing from the scope of the invention as defined in the appended claims.

I claim:

1. A pressure actuated pump unit comprising a frame, first resilient bellows mounted on said frame and adapted to be fluid connected to a source of subatmospheric pressure, said first bellows movable between expanded and contracted positions, a second resilient bellows adapted to be fluid connected to a source of fluid, said second bellows nested within said first bellows, and means interconnecting the first bellows with the second bellows for moving the first and second bellows as a unit between expanded and contracted positions in response to movement of said first bellows.

2. A vacuum actuated pump unit comprising a first resilient bellows adapted to be fluid connected to a source of subatmospheric pressure and movable between expanded and contracted positions, a second resilient bellows nested within said first bellows and responsive to the movement thereof to expand and contract therewith, said second bellows adapted to be fluid connected to a source of fluid, and means interconnecting the first bellows with the second bellows for moving the first and second bellows as a unit between expanded and contracted positions in response to movement of said first bellows.

3. A vacuum actuated pump unit comprising a first resilient bellows of a certain diameter, adapted to be fluid connected to a source of subatmospheric pressure, and movable between expanded and contracted positions, and a second resilient bellows adapted to be fluid connected to a source of fluid, said second bellows having a diameter smaller than the diameter of said first bellows, said second bellows positioned within the interior of said first bellows with a bottom wall thereof connected to a bottom wall of said first bellows, whereby said second bellows is movable between expanded and contracted positions upon like movement of said first bellows.

4. A vacuum actuated pump unit comprising a first resilient bellows having a certain diameter, said first bellows having an opening formed in one end and including a fluid fitting formed in one end thereof opening the interior thereof to the atmosphere, and a second resilient bellows having a diameter less than said first bellows and a fluid fitting at one end thereof opening the interior of said second bellows to the atmosphere, said second bellows inserted within the interior of said first bellows and closing said opening in a sealed manner, and with said second bellows fluid fitting exposed to the atmosphere, the other ends of both said first and second bellows engageable upon contraction of said first bellows, said second bellows retained by said first bellows in a position similar to any position assumed by said first bellows.

5. A vacuum actuated pump unit comprising a frame, electric switch means mounted on said frame, a first resilient bellows mounted on said frame and movable between a normally expanded position in engagement with said switch means to a contracted position spaced from said switch means, said first bellows adapted to be fluid connected to a source of subatmospheric pressure, and a second resilient bellows adapted to be fluid connected to a source of fluid, said second bellows mounted within the first bellows and movable between expanded and contracted positions in response to like movement of said first bellows.

6. A windshield washing system comprising a fluid reservoir means, a fluid discharge nozzle fluid connected to said reservoir means, a source of subatmospheric pressure, a control valve fluid connected to said source for controlling the application of said pressure, and a vacuum actuated pump unit for supplying said fluid to said nozzle, said pump unit including a first resilient bellows fluid connected to said control valve and movably responsive to the application of said pressure therefrom, and a second resilient bellows fluid connected to said reservoir means and operable to withdraw fluid from said reservoir means and to expel said withdrawn fluid through said nozzle, said first bellows nested within said second bellows with the bottom wall thereof connected to the bottom wall of said second bellows, whereby said first and second bellows move as a unit between expanded and contracted positions.

7. A windshield washing system comprising a washing fluid reservoir means, a fluid discharge nozzle fluid connected to said reservoir means, a source of subatmospheric pressure, a control valve fluid connected to said source for controlling the application of said pressure, and a vacuum actuated pump unit for supplying said washing fluid to said nozzle, said pump unit including a first resilient bellows fluid connected to said control valve and movably responsive to the application of pressure therefrom, and a second resilient bellows fluid connected to said reservoir means, said second bellows nested within said first bellows and movable, in response to movement of said first bellows, between contracted and expanded positions to sequentially withdraw fluid from said reservoir means and expel said withdrawn fluid through said nozzle.

8. A windshield clearing system comprising a wiper unit having a wiper blade, an electric circuit, and an electric motor in said circuit for operating said blade, a washer unit including a fluid reservoir, a nozzle, and a vacuum actuated pump unit for expelling fluid through said nozzle, a source of subatmospheric pressure, and a control valve for closing said circuit independently of and in combination with applying said pressure to said pump unit, said pump unit including a first resilient bellows fluid connected to said control valve and movably responsive to the application of said pressure therefrom, and a second resilient bellows fluid connected to said reservoir means to withdraw fluid from said reservoir and to expel said withdrawn fluid through said nozzle, said first bellows nested within said second bellows with the bottom wall thereof connected to the bottom wall of said second bellows, whereby said first and second bellows move as a unit between expanded and contracted positions.

9. A windshield clearing system comprising a wiper unit having a wiper blade, an electric circuit, and an electric motor in said circuit for operating said blade, a washer unit including a fluid reservoir, a nozzle, and a vacuum actuated pump unit for expelling fluid through said nozzle, a source of subatmospheric pressure, and a control valve for closing said circuit independently of and in combination with applying said pressure to said pump unit, said pump unit including a first resilient bellows fluid connected to said control valve and movably responsive to the application of said pressure therefrom, a second resilient bellows fluid connected to said reservoir means to withdraw fluid from said reservoir and to expel said withdrawn fluid through said nozzle, said first bellows nested within said second bellows with the bottom wall thereof connected to the bottom wall of said second bellows, whereby said first and second bellows move as a unit between expanded and contracted positions, and switch means in said circuit responsive to movement of said first bellows to start and stop said wiper motor in timed relation to operation of said pump unit.

10. A windshield clearing system comprising a wiper unit having a wiper blade and an electric motor for operating said wiper blade, a washer unit including a nozzle and a pump assembly including a first resilient bellows movable between expanded and contracted positions in response to the application and withdrawal of a subatmospheric pressure to and from said first bellows, a second resilient bellows movable between expanded and contracted positions in response to movement of said first bellows, whereby to discharge fluid through said nozzle in response to contraction of said first bellows, switch means electrically connected to said electric motor, said switch means engaged by said first bellows when in its expanded position and held in an open position, said switch means movable to a closed position to operate said wiper motor in response to movement of said first bellows to its contracted position, and means for bleeding air under atmospheric pressure into said first bellows to delay the expansion thereof.

References Cited in the file of this patent

UNITED STATES PATENTS

| | | |
|---|---|---|
| 2,970,335 | Webb | Feb. 7, 1961 |
| 2,984,188 | Tuckey et al. | May 16, 1961 |
| 3,017,650 | Schaal | Jan. 23, 1962 |